United States Patent Office 3,046,153
Patented July 24, 1962

3,046,153
WATER DISPERSED DRIER COMPOSITIONS
Gilbert G. Unkefer, Russell, James G. Barrick, Cleveland, and William H. Meek, Jr., Akron, Ohio, assignors to The Harshaw Chemical Company, Cleveland, Ohio, a corporation of Ohio
No Drawing. Filed Sept. 11, 1958, Ser. No. 760,303
5 Claims. (Cl. 106—310)

This invention relates to the preparation of water dispersed compositions suitable for additives for water dispersed paints and coatings.

Water dispersible (as distinguished from water dispersed) metal carboxylates already have been used as additives for water dispersed film forming compositions, and accordingly we do not claim such compositions but rather only compositions comprising water dispersions of polyvalent metal carboxylates and water dispersions of coating compositions containing them.

The coating compositions in connection with which our novel additives are to be used are, for example, the so-called "latex" paints, or various synthetic or natural resin coating materials all of which are dispersed in water preparatory to application as a coating (which term includes impregnant) for various surfaces including fibrous materials such as textiles, wood and the like. Water dispersions in connection with which our invention may be realized may be, for example: dispersions in aqueous media of styrene-butadiene copolymers; dispersions in aqueous media of plasticized homopolymers such as styrene and vinyl acetate; dispersions in aqueous media of plasticized vinyl chloride, or vinyl chloride-vinylidine chloride, acrylate ester and methacrylate ester polymers and copolymers; and dispersions in aqueous media of materials such as those mentioned above, modified by the addition of material such as alkyd resins or emulsions thereof in aqueous media. The most important features of a latex paint or coating involving the present invention are that there be used a water dispersed film-forming vehicle and that there be added at some stage an agent which will promote film formation or otherwise improve the coating. Other important features are the pigments, stabilizers, thickeners, surfactants, etc.

Heretofore, water dispersible metal soap compositions intended for addition to aqueous dispersions such as latex paints or coatings have been produced by adding various hydrophobic diluents, surfactants, and coupling agents to conventional oil soluble metal soap compositions. The resulting mixtures could be dispersed in compositions such as latex paints by sufficiently energetic treatment although the particle size of the additive thus dispersed in the latex paint might not be similar and the agitation would need to be applied to the entire dispersion, thus involving unnecessary treatment and unnecessary expense. Compositions according to the present invention are dispersed in water prior to addition to the latex paint or the like and, accordingly, can be dispersed to a particle size similar to that of the latex, the dispersion treatment being of the additive only and, therefore, treatment being at minimum cost and particle size being most easily controlled.

In the formulation of water dispersible (as distinguished from water dispersed) soap compositions according to prior practice, it has been customary to include an optimum quantity of a hydrophobic diluent or hydrophobic volatile solvent such as naphtha, mineral spirits, xylene or the like in order to reduce the viscosity of the mixture. The amount of such diluent is quite critical in view of the need to obtain the proper viscosity and to introduce a sufficient amount of metal. These hydrophobic diluents are essential in prior art practice but they are not to be desired since they may coalesce in part with the discrete particles of the latex or of the pigment, preventing thorough admixture. Again, the hydrophobic solvent such as naphtha may affect the surface appearance of the resulting film of paint or the like by reason of the fact that a small amount remains in the film and does not volatilize. For example, this retention of hydrophobic solvent may reduce gloss or cause pitting or pinholing. Also these solvents are ordinarily volatile and flammable and therefore undesirable from the standpoint of health and safety.

It is an object of the present invention to overcome the above indicated difficulties of the present practice by the introduction into latex paints and other coating compositions of additives in the form of water dispersions of the active agents, and such agents being in a state of dispersion suitable for the film forming material with which they are to be used and such dispersions being free of undesirable hydrophobic diluents.

The additive compositions according to the present invention are polyvalent metal salts of organic carboxylic acids having from 6 to 22 carbon atoms in the molecule and being soluble in oils, and insoluble in water, such salts being dispersed in water at a particle size not substantially greater than the particle size of the disperse phase of the latex paint or other dispersion and preferably not greater than from 1 to 2 microns average particle size. Examples of compositions according to our invention are water dispersions of divalent, trivalent and tetravalent metal salts of naphthenic acids, tall oil acids, petroleum sulfonate acids, linseed oil acids, soy bean oil acids, oleic acid, 2-ethyl hexoic acid, nonanoic acids and ether acids such as butoxy butyric acids. For commercial reasons we prefer to use compositions based on those acids just named and for the same reasons we prefer naphthenic acids, tall oil acids and 2-ethyl hexoic acid above others, used singly or in combination. The metals, the carboxylates of which we prefer to use are lead, cobalt, manganese, zirconium, zinc, calcium, copper, cadmium, barium, lithium, cerium, and iron. In the event the additive is a drier, we prefer to use compositions based on lead, cobalt or manganese, whereas if it is for heat and/or light stabilization of synthetic resins, we prefer barium and/or cadmium compounds. The invention, however, is not limited to these particular preferred compositions but in its broadest aspects may include compounds of other metals and numerous other acids.

In the production of our water dispersed additives, we prefer to dissolve a suitable nonionic surface active agent or combination of such agents in a quantity of a suitable solid, polyvalent metal carboxylate in molten state, and subsequently disperse this mixture in a water solution of suitable dispersing agents and/or protective colloids. It is preferable to use both a surfactant and a protective colloid but it is possible to omit the protective colloid without complete loss of the advantages of the invention. The two mixtures are agitated together at a suitable temperature to maintain the metal carboxylate in liquid state until dispersion is complete. The metal carboxylates may be melted in a jacketed vessel and the surfactant added thereto with agitation while cooling the resulting mixture to a temperature of from 90° C. to 100° C. To this continuously agitated fluid mixture there may be slowly added an aqueous solution of a protective colloid. When this is done, there will be formed at first a water-in-oil type dispersion but upon continued agitation inversion will occur so that there is produced an oil-in-water type dispersion. The inversion is marked by a sudden decrease in viscosity and a sudden lightening of the color of the dispersion. The metal carboxylates should in addition to the foregoing specifications be such as will melt or soften at or below 110° C., preferably they should be such as would melt in the range from 90° C. to 110° C. and most suitably should be such as will melt in the range from 90° C. to 100° C. The stearates, for example, tend to melt at too high temperatures and are thus unsuitable for the practice of our invention. The order of addition of the protective colloid solution to the soap surfactant mixture may be reversed with equally good results, i.e., the soap or the like mixture with surfactant may be added to an agitated water solution of the protective colloid with equivalent results.

The surfactant to be used in the foregoing process may be any one of numerous nonionic surfactants. Among others we may use surfactants of the types: alkyl phenoxy polyoxyethylene ethanols, ethylene oxide condensates, ethyl aryl poly ester alcohols, polyoxyethylated fatty alcohols, polyethylene glycol esters of fatty acids, alkyl aryl polyoxyethylene ethers, polyoxyethylene alkyl alcohols, polyoxyethylated vegetable oils, alkyl phenyl polyethylene glycol ethers, polyoxyethylene sorbitan esters of fatty acids, sorbitan esters of fatty acids, polyglycol esters, propylene glycol esters of fatty acids, alkyl aryl polyethylene glycols, alkyl aryl polyglycol ethers, alkyl polyoxyethylene ethers, polyoxyethylated fatty acids, and alkyl phenol ethylene oxide condensates.

We prefer to use nonionic surfactants sold under the registered tradename "Tergitol," being an alkyl phenyl polyethylene glycol ether, or a surfactant sold under the registered tradename "Nonisol," being an acid ester of polyethylene glycol, suitably an oleic acid ester, or a surfactant sold under the registered tradename "Emulphor," being a polyoxyethylated fatty alcohol, or a surfactant sold under the registered tradename "Kyro," being an alkyl phenol ethylene oxide condensate, or a mixture of a plurality thereof. We prefer to use a "Tergitol" of specific gravity from 1.04 to 1.06 at 25° C. and refractive index of 1.4800 to 1.4900 at 25° C. In the event we use "Nonisol," we prefer to use one which has a specific gravity from 1.05 to 1.065 at 40° C. and a refractive index from 1.4500 to 1.4650 at 40° C. In the event we use an "Emulphor," we prefer to use one which has a specific gravity from 1.04 to 1.06 at 40° C. and a refractive index of 1.4450 to 1.4600 at 40° C. In the event we choose to use a "Kyro," we prefer to use one which has a specific gravity of 1.04 to 1.06 at 25° C. and a refractive index of 1.4800 to 1.4900 at 25° C.

Protective colloids suitable for the practice of the invention may be, for example, methoxy cellulose, hydroxy ethyl cellulose, viscosity from 3500 to 5000 centipoises in 2% water solution at 20° C., methyl carboxy cellulose, polyvinyl pyrrolidone or mixtures thereof. Other protective colloids may be used. We prefer to use polyvinyl pyrrolidone of molecular weight from 30,000 to 50,000, in view of the fact that it has a pronounced dispersive ability in addition to its character as a protective colloid. We wish it to be understood that the invention is not limited to the use of these named protective colloids but that any nonionic water soluble protective colloid may be used.

In addition to the substances named, we may include a fungicidal or bactericidal agent such as a phenolic compound of the character sold under the registered tradename "Dowicide B." Again we may employ glyoxol or formaldehyde for imparting anti-freezing properties. These may be added with agitation immediately after the last portion of protective colloid solution has been added.

Proportions of water to polyvalent metal carboxylate may be in the range from 0.7 to 2.5 grams of the carboxylate per gram of water, preferably from 1.0 to 2.0 grams of the carboxylate per gram of water; the proportions of surfactant may be in the range from 2% to 8% of surfactant based on the water plus the polyvalent metal carboxylate, preferably from 4% to 6% and the proportion of protective colloid may be in the range from 1% to 5% based on the water plus polyvalent metal carboxylate, preferably from 3% to 4%. All percentages are by weight.

The latex paints and other water dispersed coating material requiring additives are essentially dispersions which upon exposure in films and vaporization of the water content will form a hard protective coating. Ordinarily they will contain a pigment, as for example $TiO_2$, but some uses can be found for the composition when no pigment is present. The latex is essential and the pigment is of great importance. The latex may be one of those mentioned above, that is, styrene-butadiene copolymers, styrene and vinyl acetate, vinyl chloride, vinyl chloride-vinylidene chloride, acrylate ester and methacrylate ester polymers and copolymers and modified such compositions produced by addition of alkyd resins or the like. These dispersions are called latexes and can be used in various combinations. Many such latexes require or are improved by additives which ordinarily are added in solution in organic solvents such as hydrocarbon solvents, as for example, naphtha, kerosene, benzene, toluene or any of numerous volatile solvents not miscible with water.

In addition to the latex and the pigment, the latex paint or other coating composition may contain a dispersant, a thickener, such as methyl cellulose, preservatives, antifoamers, and pH adjusting compounds, all in aqueous medium as before indicated. Examples of compositions in connection with which the novel dispersed compositions can be used are as follows:

EXAMPLE I

*Pigment Dispersion*

| | Lbs./100 gals. |
|---|---|
| Titanium dioxide | 250 |
| Zinc lithopone | 100 |
| Mica | 56 |
| Potassium tripolyphosphate | 1.25 |

Water with above to make 100 gals.

*Paint Let Down*

| | |
|---|---|
| Styrene-butadiene copolymer (67–33) lbs./100 gals | 379 |
| Casein (15% water solution) lbs./100 gals | 73 |
| pH | 9.5 |
| Water lbs./100 gals | 61 |
| Percent solids | 52.5 |

EXAMPLE II

*Pigment Dispersion*

| | Lbs./100 gals. |
|---|---|
| Titanium dioxide | 250 |
| Calcium carbonate | 50 |
| Clay | 50 |
| Silica | 25 |
| Ultramarine blue | 0.25 |
| Potassium tripolyphosphate | 1.50 |
| Water | 230 |

*Paint Let Down*

| | |
|---|---|
| Styrene-butadiene copolymer (67–33) lbs./100 gals | 340 |
| Soybean protein lbs./100 gals | 75 |
| pH | 9.5 |
| Water lbs./100 gals | 40 |
| Percent solids | 53 |

These are merely examples of water dispersed formulations to which may be added the water dispersions according to the invention. $TiO_2$ may be replaced in either example with numerous white or colored pigments. One or a plurality of pigments may be used. Various dispersants may be used instead of potassium tripolyphosphate. The styrene-butadiene may be replaced in these examples by other latexes as pointed out above. A dispersion of vinyl chloride in water (which may contain one part of vinyl chloride per part of water, by weight) may be stabilized against the action of heat and light by adding thereto approximately 2.0% of cadmium naphthenate and 3.0% of barium 2-ethyl hexoate. The paint of Example I, or that of Example II, can be caused to cure faster by adding thereto 1.0% of a water dispersion of cobalt, lead or manganese naphthenate or tallate or 2-ethyl hexoate.

Specific examples of water dispersions according to the invention are as follows:

EXAMPLE III

*Cobalt Naphthenate Dispersion*

A water dispersible cobalt naphthenate dispersion containing 6% by weight of cobalt as metal may be made as follows: 30 grams of a cobalt naphthenate soap containing 10% of cobalt as metal and 2.5 grams of Tergitol surfactant are heated together in a 100 ml. beaker to 100° C. to 110° C. to form a fluid mixture. This mixture is agitated with a glass paddle-type stirrer and, when the temperature has fallen to 85° C. to 95° C., 17.5 grams of a 3% water solution of polyvinylpyrrolidone, is slowly added. A water-in-oil dispersion forms first but as more of the polyvinylpyrrolidone solution is added, "inversion" occurs and an oil-in-water type of dispersion develops. The dispersion so formed is a pourable liquid, in which the majority of the discrete particles of dispersed cobalt soap are less than 1.0 micron in size. When added to a further quantity of water or water containing media, this material disperses immediately to form a more dilute dispersion, stable for extended periods.

The end product is a light pink viscous fluid consisting of a water dispersible oil-in-water type of dispersion containing 6% cobalt. This material is useful as a catalyst in the curing of film-forming materials particularly water base emulsion paints, such as those shown in Examples I and II. It may be noted that the so-called emulsion paints usually are dispersions of solids in liquid rather than of liquids in liquids.

EXAMPLE IV

*Lead 2-Ethyl Hexoate Dispersion*

A dispersion of lead 2-ethyl hexoate containing 18% of lead as metal may be made as in Example III, by utilizing 21.9 grams of lead 2-ethyl hexoate containing 40.25% by weight of lead as metal, 10.0 grams of Emulphor and 18.1 grams of a 3% water solution of polyvinylpyrrolidone The end product is a white viscous fluid consisting of a water dispersion containing 18% lead. This material is useful as a catalyst in the curing of film-forming materials, particularly water base emulsion paints, for example, those described in Examples I and II.

EXAMPLE V

*Manganese Naphthenate Dispersion*

A water dispersible manganese naphthenate dispersion containing 6% by weight of manganese as metal may be made as follows: 31.4 grams of manganese naphthenate soap containing 9.5% of manganese as metal and 2.5 grams of Tergitol surfactant are heated together in a 100 ml. beaker to 100° C. to 110° C. to form a fluid mixture. This mixture is agitated with a glass paddle-type stirrer and, when the temperature has fallen to 85° C. to 95° C., 16.1 grams of a 3% water solution of polyvinylpyrrolidone is slowly added. A water-in-oil dispersion forms first but as more of the polyvinylpyrrolidone solution is added, "inversion" occurs and an oil-in-water type of dispersion develops. The dispersion so formed is a pourable liquid, in which the majority of the discrete particles of dispersed manganese soap are less than 1.0 micron in size. When added to a further quantity of water or water containing media, this material disperses immediately to form a more dilute dispersion, stable for extended periods.

The end product is a white viscous fluid dispersion containing 6% manganese. This material is useful as a catalyst in the curing of film-forming materials particularly water base emulsion paints, e.g. those described in Examples I and II.

EXAMPLE VI

*Copper Tallate Dispersion*

A dispersion of copper tallate containing 6% of copper as metal may be made as in Example III by utilizing 30.0 grams of copper tallate containing 10% by weight of copper as metal and 2.5 grams of Tergitol and 17.5 grams of a 3% aqueous solution of polyvinylpyrrolidone.

The end product is a bright green viscous fluid consisting of a water dispersion containing 6% copper. This material is useful as a pesticide and fungicide in the preservation of cellulosic materials, as canvas, wood, etc., and may be incorporated in a latex paint such as those described in Examples I and II, or may be applied in water dispersion of suitable dilution.

In like manner numerous metal carboxylates can be dispersed in water to make a stable water dispersion suitable for addition to various water emulsion paints and coatings. Examples thereof are set forth in Table I below:

TABLE I

| Number | H₂O, g. | Metal Carboxylate, g. | Surfactant, g. | Protective Colloid, g. |
|---|---|---|---|---|
| 1 | 17.0 | Cobalt Naphthenate, 30.0 | Tergitol, 2.5 | Polyvinylpyrrolidone, 0.525. |
| 2 | 23.0 | Cobalt Tallate, 23.5 | Emulphor, 2.5 | Polyvinylpyrrolidone, 0.7. |
| 3 | 23.0 | Cobalt Soyate, 23.5 | Monisol, 2.5 | Polyvinylpyrrolidone, 0.7. |
| 4 | 16.0 | Manganese Naphthenate, 31.4 | Tergitol, 2.5 | Polyvinylpyrrolidone, 0.5. |
| 5 | 14.5 | Lead Naphthenate, 32.4 | Tergitol, 2.5 | Polyvinylpyrrolidone, 0.45. |
| 6 | 16.2 | Zirconium Naphthenate, 30.8 | Tergitol, 2.5 | Polyvinylpyrrolidone, 0.5. |
| 7 | 26.0 | Zinc Naphthenate, 20.6 | Tergitol, 2.5 | Polyvinylpyrrolidone, 0.8. |
| 8 | 18.3 | Iron Linoleate, 28.6 | Tergitol, 2.5 | Polyvinylpyrrolidone, 0.6. |
| 9 | 20.7 | Cobalt-Lead Naphthenate, 25.7 | Tergitol, 2.5 | Polyvinylpyrrolidone, 0.6. |
| 10 | 17.0 | Copper Tallate, 30.0 | Tergitol, 3.0 | Polyvinylpyrrolidone, 0.5. |
| 11 | 22.6 | Cerium Naphthenate, 24.2 | Tergitol, 2.5 | Polyvinylpyrrolidone, 0.6. |
| 12 | 19.8 | Cadmium Naphthenate, 24.1 | Emulphor, 2.5 | Polyvinylpyrrolidone, 0.6. |
| 13 | 17.2 | Cobalt Naphthenate, 30.0 | Tergitol, 2.5 | Methyl Cellulose, 0.35. |
| 14 | 17.3 | Cobalt Naphthenate, 30.0 | Tergitol, 2.5 | Hydroxyethyl Cellulose, 0.35. |
| 15 | 14.8 | Lead Naphthenate, 32.4 | Tergitol, 2.5 | Methyl Cellulose, 0.3. |
| 16 | 14.8 | Lead Naphthenate, 32.4 | Tergitol, 2.5 | Hydroxyethyl Cellulose, 0.3. |
| 17 | 17.2 | Manganese Naphthenate, 30.0 | Tergitol, 2.5 | Methyl Cellulose, 0.35. |
| 18 | 16.4 | Zirconium Naphthenate, 30.8 | Kyro, 2.5 | Methyl Cellulose, 0.3. |
| 19 | 16.4 | Zirconium Naphthenate, 30.8 | Kyro, 2.5 | Hydroxyethyl Cellulose, 0.3. |
| 20 | 17.9 | Calcium Naphthenate, 26.7 | Tergitol, 2.5 | Methyl Cellulose, 0.36. |
| 21 | 20.7 | Cobalt 2-ethyl Hexoate, 18.7 | Emulphor, 10.0 | Polyvinylpyrrolidone, 0.6. |

The method of compounding the compositions shown in Table I can be the same as shown in Examples III and IV above and they can be used in the compositions shown in Examples I and II above. The cadmium compounds are well adapted for inclusion in water dispersions of polyvinyl chloride for use as stabilizers. The cobalt, lead and manganese compounds are well adapted for use as siccatives for the water paints of Examples I and II and others.

Having thus described the invention, what is claimed is:

1. As a composition of matter a water dispersion of from 0.7 to 2.5 grams per gram of water of a metal carboxylate having from 6 to 22 carbon atoms in the molecule, melting not higher than 110° C., said carboxylate being insoluble in water and soluble in oil, said carboxylate being selected from the group consisting of lead, cobalt, manganese, zirconium, zinc, calcium, copper, cadmium, barium, lithium, cerium, and iron salts of naphthenic acids, tall oil acids, 2-ethyl hexoic acid, petroleum sulfonate acids, linseed oil acids, soy bean oil acids, oleic acid, nonanoic acids, and ether acids, said dispersion having an average particle size not greater than from 1 to 2 microns, and containing from 2% to 8% based on the weight of the water plus the metal carboxylate of a nonionic surfactant selected from the group consisting of alkyl phenoxy polyoxyethylene ethanols, ethylene oxide condensates, ethyl aryl polyester alcohols, polyoxyethylated fatty alcohols, polyethylene glycol esters of fatty acids, alkyl aryl polyoxyethylene ethers, polyoxyethylene alkyl alcohols, polyoxyethylated vegetable oils, alkyl phenyl polyethylene glycol ethers, polyoxyethylene sorbitan esters of fatty acids, sorbitan esters of fatty acids, polyglycol esters, propylene glycol esters of fatty acids, alkyl aryl polyoxyethylene glycols, alkyl aryl polyglycol ethers, alkyl polyoxyethylene ethers, polyoxyethylated fatty acids, and alkyl phenol ethylene oxide condensates.

2. As a composition of matter a water dispersion of from 0.7 to 2.5 grams per gram of water of a non-water soluble metal carboxylate of the class consisting of lead, cobalt, manganese, zirconium, zinc, calcium, copper, cadmium, barium, lithium, cerium and iron salts of naphthenic acids, tall oil acids, 2-ethyl hexoic acid, petroleum sulfonate acids, linseed oil acids, soy bean oil acids, oleic acid, nonanoic acids, and ether acids, said carboxylate having an average particle size not greater than from 1 to 2 microns and a surfactant, said surfactant consisting essentially of from 2% to 8% based on the weight of the water plus the metal carboxylate of a nonionic surfactant selected from the group consisting of alkyl phenoxy polyoxyethylene ethanols, ethylene oxide condensates, ethyl aryl polyester alcohols, polyoxyethylated fatty alcohols, polyethylene glycol esters of fatty acids, alkyl aryl polyoxyethylene ethers, polyoxyethylene alkyl alcohols, polyoxyethylated vegetable oils, alkyl phenyl polyethylene glycol ethers, polyoxyethylene sorbitan esters of fatty acids, sorbitan esters of fatty acids, polyglycol esters, propylene glycol esters of fatty acids, alkyl aryl polyethylene glycols, alkyl aryl polyglycol ethers, alkyl polyoxyethylene ethers, polyoxyethylated fatty acids, and alkyl phenol ethylene oxide condensates, and from 1% to 5% based on the weight of the water plus the metal carboxylate, of a protective colloid selected from the group consisting of methoxy cellulose, hydroxy ethyl cellulose, methyl carboxy cellulose, and polyvinylpyrrolidone.

3. In a process for the preparation of an aqueous dispersion coating composition, the step of adding with agitation to an aqueous dispersion of a resinous solid-film-forming material a drier composition in the form of a water dispersion of a non-water soluble drier metal salt having an average particle size in the disperse phase not substantially greater than the average particle size in the disperse phase of said first mentioned dispersion, said drier composition consisting essentially of from 0.7 to 2.5 grams per gram of water of a water-insoluble, oil-soluble, drier metal salt of an organic monocarboxylic acid having from 6 to 22 carbon atoms in the molecule and having a melting point not above 110° C., said metal salt being a carboxylate selected from the group consisting of lead, cobalt, manganese, zirconium, zinc, calcium, copper, cadmium, barium, lithium, cerium and iron salts of naphthenic acids, tall oil acids, 2-ethyl hexoic acid, petroleum sulfonate acids, linseed oil acids, soy bean oil acids, oleic acid, nonanoic acids, and ether acids, and from 2% to 8%, based on the weight of the water plus the drier metal salt, of a nonionic surfactant selected from the group consisting of alkyl phenoxy polyoxyethylene ethanols, ethylene oxide condensates, ethyl aryl polyester alcohols, polyoxyethylated fatty alcohols, polyethylene glycol esters of fatty acids, alkyl aryl polyoxyethylene ethers, polyoxyethylene alkyl alcohols, polyoxyethylated vegetable oils, alkyl phenyl polyethylene glycol ethers, polyoxyethylene sorbitan esters of fatty acids, sorbitan esters of fatty acids, polyglycol esters, propylene glycol esters of fatty acids, alkyl aryl polyethylene glycols, alkyl aryl polyglycol ethers, alkyl polyoxyethylene ethers, polyoxyethylated fatty acids, and alkyl phenol ethylene oxide condensates.

4. In a process for the preparation of an aqueous dispersion coating composition, the step of adding with agitation to a water dispersion of a resinous solid-film-forming material, a drier composition in the form of a water dispersion of a non-water soluble drier metal salt having an average particle size in the disperse phase not substantially greater than the average particle size in the disperse phase of said first mentioned dispersion, said drier composition consisting essentially of from 0.7 to 2.5 grams per gram of water of a water-insoluble, oil soluble, polyvalent drier metal salt of an organic monocarboxylic acid having from 6 to 22 carbon atoms in the molecule and having a melting point from 90° C. to 110° C., said drier metal salt being a carboxylate selected from the group consisting of lead, cobalt, manganese, zirconium, zinc, calcium, copper, cadmium, barium, cerium and iron salts of naphthenic acids, tall oil acids, 2-ethyl hexoic acid, petroleum sulfonate acids, linseed oil acids, soy bean oil acids, oleic acid, nonanoic acids, and ether acids, and from 2% to 8%, based on the weight of the water plus the polyvalent metal carboxylate, of a nonionic surfactant selected from the group consisting of alkyl phenoxy polyoxyethylene ethanols, ethylene oxide condensates, ethyl aryl poly ester alcohols, polyoxyethylated fatty alcohols, polyethylene glycol esters of fatty acids, alkyl aryl polyoxyethylene ethers, polyoxyethylene alkyl alcohols, polyoxyethylated vegetable oils, alkyl phenyl polyethylene glycol ethers, polyoxyethylene sorbitan esters of fatty acids, sorbitan esters of fatty acids, polyglycol esters, propylene glycol esters of fatty acids, alkyl aryl polyethylene glycols, alkyl aryl polyglycol ethers, alkyl polyoxyethylene ethers, polyoxyethylated fatty acids, and alkyl phenol ethylene oxide condensates, and from 1% to 5%, based on the weight of the water plus polyvalent metal carboxylate, of a protective colloid selected from the group consisting of a methoxy cellulose, hydroxy ethyl cellulose, methyl carboxy cellulose, and polyvinylpyrrolidone.

5. In a process for the preparation of an aqueous dispersion coating composition, the steps of preparing a first aqueous dispersion consisting essentially of a liquid butadiene-styrene copolymer latex, a pigment and a surfactant, and mixing with said first aqueous dispersion a second aqueous dispersion of a drier component consisting essentially of (1) from 0.7 to 2.5 grams per gram of water of a water insoluble, oil soluble, polyvalent metal salt of an organic carboxylic acid having from 6 to 22 carbon atoms in the molecule, said polyvalent metal salt being a carboxylate selected from the group consisting of lead, cobalt, manganese, zirconium, zinc, calcium, copper, cadmium, barium, cerium and iron salts of naphthenic acids, tall oil acids, 2-ethyl hexoic acid, petroleum sulfonate acids, linseed oil acids, soy bean oil acids, oleic acid, nonanoic acids, and ether acids, said metal salt having an average particle size in the disperse phase not substantially greater than the average particle size in the disperse phase of said first dispersion, and (2) a nonionic surfactant in an amount of from 2% to 8%, based on the weight of the water plus the polyvalent metal carboxylate, said surfactant being selected from the group consisting of alkyl phenoxy polyoxyethylene ethanols, ethylene oxide condensates, ethyl aryl poly ester alcohols, polyoxyethylated fatty alcohols, polyethylene glycol esters of fatty acids, alkyl aryl polyoxyethylene ethers, polyoxyethylene alkyl alcohols, polyoxyethylated vegetable oils, alkyl phenyl polyethylene glycol ethers, polyoxyethlene sorbitan esters of fatty acids, sorbitan esters of fatty acids, polyglycol esters, propylene glycol esters of fatty acids, alkyl aryl polyethylene glycols, alkyl aryl polyglycol ethers, akyl polyoxyethylene ethers, polyoxyethylated fatty acids, and alkyl phenol ethylene oxide condensates, and from 1% to 5% based on the weight of the water plus the polyvalent metal carboxylate, of a protective colloid selected from the group consisting of a methoxy cellulose, hydroxy ethyl cellulose, methyl carboxy cellulose, and polyvinylpyrrolidone.

References Cited in the file of this patent

UNITED STATES PATENTS

| | | | |
|---|---|---|---|
| 2,337,466 | Herbert | Dec. 21, | 1943 |
| 2,423,044 | Nowak | June 24, | 1947 |
| 2,567,678 | Morrison | Sept. 11, | 1951 |
| 2,663,696 | Armatys | Dec. 22, | 1953 |
| 2,681,322 | Auer | June 15, | 1954 |
| 2,683,699 | Gehring | July 13, | 1954 |
| 2,837,444 | Hahn | June 3, | 1958 |